UNITED STATES PATENT OFFICE.

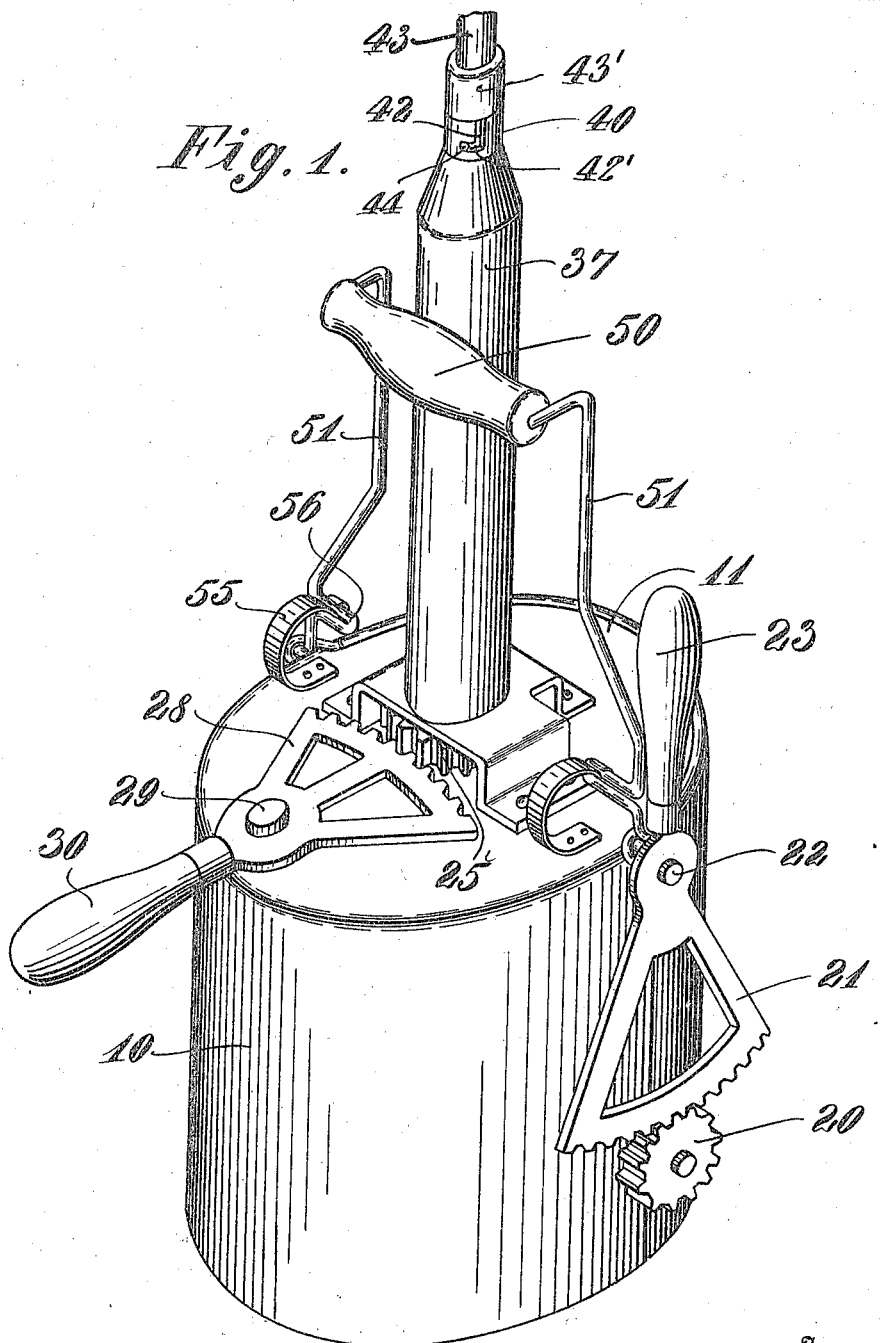

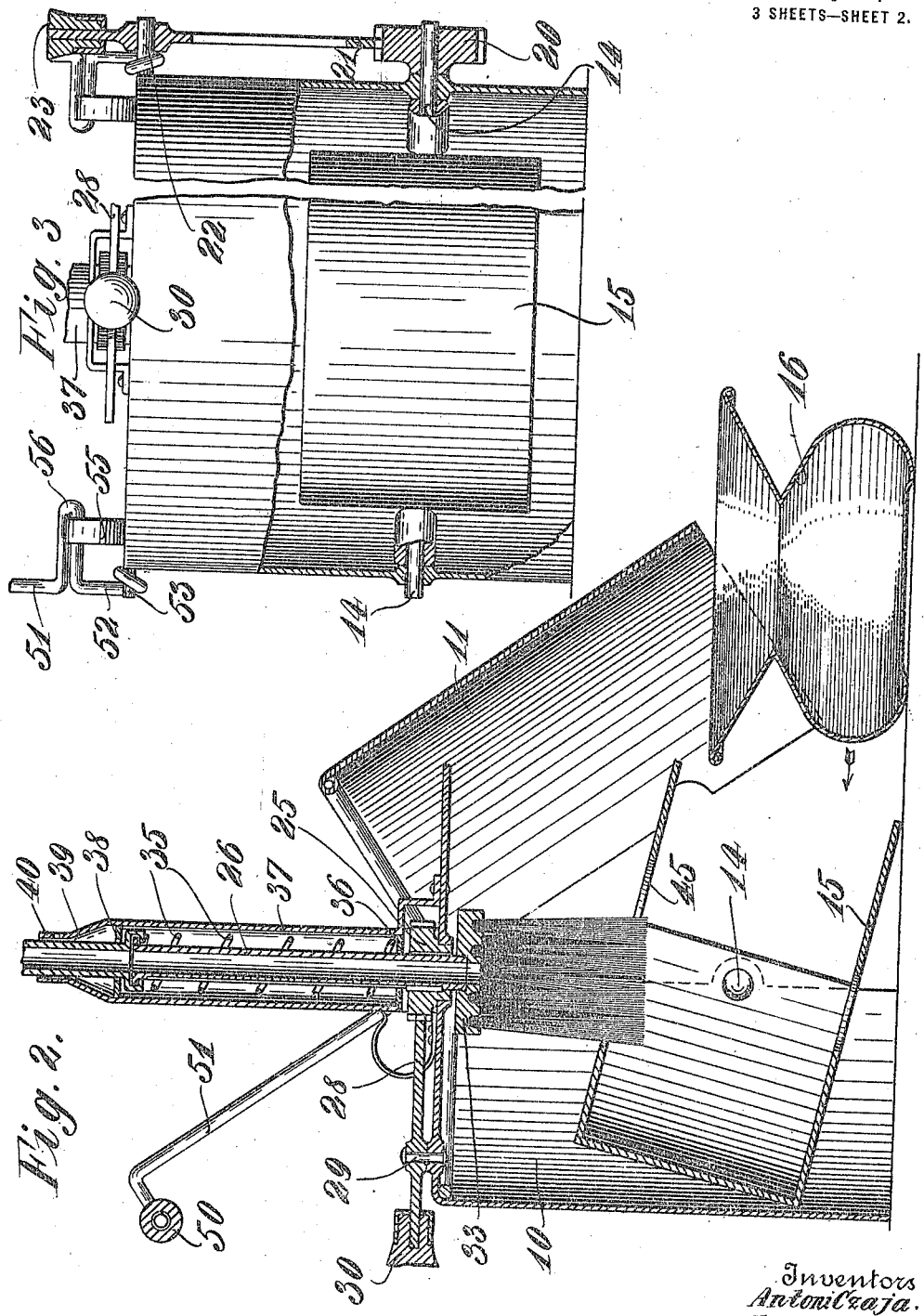

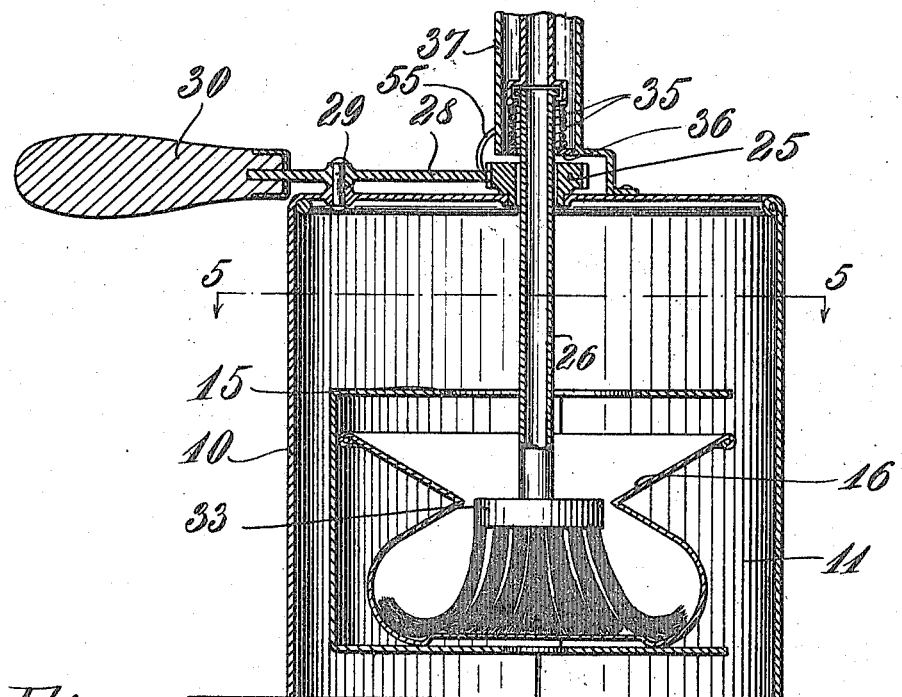
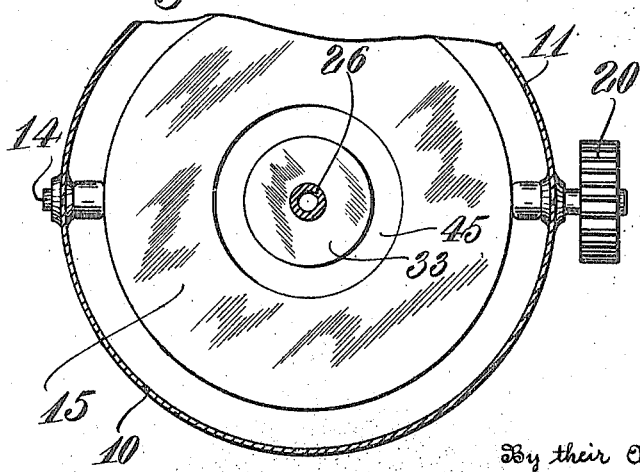
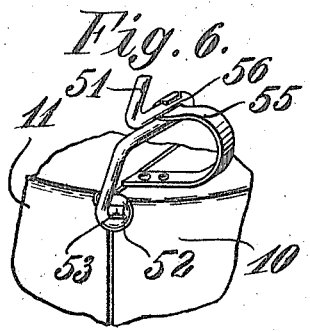

ANTONI CZAJA AND JOHN HAREZA, OF GARY, WEST VIRGINIA.

CUSPIDOR-CLEANER.

1,233,650.　　　　　　　Specification of Letters Patent.　　Patented July 17, 1917.

Application filed December 15, 1916. Serial No. 137,141.

*To all whom it may concern:*

Be it known that we, ANTONI CZAJA, a subject of the Emperor of Austria, resident of Gary, county of McDowell, and State of West Virginia, and JOHN HAREZA, resident of Gary, county of McDowell, and State of West Virginia, have invented certain new and useful Improvements in Cuspidor-Cleaners, of which the following is a specification.

This invention relates to improvements in apparatus for cleansing cuspidors and like hollow containers, and has as its principal object the provision of means whereby the container to be cleansed is wholly enveloped within the casing so as to prevent the contents from being scattered while the cleansing operation is being performed.

Another object is to provide means whereby the article to be cleansed may be oscillated so as to bring its interior into position where it can be acted upon to the best advantage by the brush, and a still further object is to provide means whereby the brush may be raised or lowered and caused to rotate without contact of the hands with the article.

These and other objects are attained by the novel construction and combination of parts hereafter described and shown in the accompanying drawings, forming a material part of this specification, and in which:—

Figure 1 is a perspective view showing the cleaning apparatus in a closed position.

Fig. 2 is a vertical sectional view indicating the manner in which the article to be cleansed is received within the casing.

Fig. 3 is a partial front elevational view of the same.

Fig. 4 is a vertical sectional view showing the article in position for operation.

Fig. 5 is a sectional view taken on line 5—5 of Fig. 4, and

Fig. 6 is a fragmentary perspective view illustrating the bail connecting means.

In the embodiment of the apparatus as shown, a cylindrical casing is divided on its longitudinal axis into two parts 10 and 11, the latter of which is hingedly engaged along its top at the center line to the other, forming in effect a casing in which is journaled a shaft 14 having mounted on it an interior receptacle 15 open at one side and adapted to receive the article to be cleaned, here represented by the cuspidor 16, the same being retained within the casing 15 when the hinged element 11 is closed.

The shaft 14 extends out at one end and has secured to it a pinion 20 meshing with which is a rack segment 21 rotatably engaged with a fixed pin 22, and provided with an operating handle 23 at its upper end which upon being actuated causes the inner casing 15 to oscillate.

A similar pinion 25 is slidably keyed to the lower section of the hollow stem 26 which passes through an opening centrally formed in the cover of the main or outer casing, and has engaged with it a gear segment 28, pivoted by the pin 29 to the top of the casing and provided with an operating handle 30 by which the segment may be moved in a horizontal plane, causing the stem 26 to be rotated in opposite directions, and also the brush 33 rigidly attached at its lower end within the outer casing.

Surrounding the tubular stem 26 is a coiled spring 35 by means of which the brush is held in a normally raised position, the lower end of the spring pressing against a head 36 formed with an enveloping tube 37, also having a partition plate 38 at its upper end.

The extreme outer end of the casing 37 is formed into a cone 39 ending in a cylindrical extension 40, having an open longitudinal slot 42, made with an angularly turned portion 42', receptive of a pin 44, secured below the enlarged internally threaded end 43* of the tubular handle element 43 through which water or cleansing solution is introduced through its connection with the hollow stem 26 and brush 33 to the article cleansed, the brush passing into the article through the opening 45 formed in the casing 15 at its top.

A handle 50 is provided by which the apparatus may be transported from place to place, the handle being engaged through a bent wire 51, the extreme lower ends of which are formed into eyes 52 engageable with the ears 53 and 22 secured to the cover of the outer casing.

Spring elements 55 are riveted to the cover of the outer casing, the same being turned reentrantly and passed through the loops 56, formed in the bail 51, thereby providing means whereby the bail is held in a substantially vertical position.

In operation, the hinged side 11 of the outer casing being turned upward, the article to be cleansed may be inserted through the opening in the side of the inner casing 15, and the casing element 11 closed, the brush may be pressed downward overcoming the tension of the spring 35, causing the brush to pass through the opening 45 into the cuspidor, a current of water or the like passing through the tube 26.

The brush may then be rotated by means of the handle 30 and the cuspidor oscillated through the handle 23 thereby providing means for thoroughly cleansing its interior.

Obviously the casings prevent water or other material from issuing in an undesirable manner and the apparatus may be transported from place to place as desired.

Having thus described my invention, what I claim as new, and desire to secure by Letters Patent, is:—

1. In an implement of the class described, the combination with a cylindrical casing comprised of two substantially uniform sections, one of said sections being hinged to the other, of a receptacle supported within said casing adapted to receive the article to be cleansed, a shaft upon which said inner receptacle is mounted, means for oscillating said shaft, a brush rotatably and slidably mounted in said casing, means for elevating and depressing said brush, and means for rotating said brush.

2. In an apparatus of the class described, the combination with a casing having a movable side, a receptacle oscillatably mounted in said casing, a handle engaged with said casing, means for maintaining said handle in a vertical position, a brush suspended within said casing, means whereby said brush may be raised or lowered, means permitting a flow of liquid to pass through said brush, and means for rotating said brush.

3. In an apparatus of the class described, the combination with a water supply pipe and a cylindrical casing having a hinged section, of a tube rigidly engaged at the center of said casing and extending thereabove, a handle bail hingedly engaged with said casing, means for maintaining said handle bail in a normally erect position, a brush in said casing, a hollow stem supporting said brush, said stem passing through said tube, and engaging with said supply pipe, means in said tube whereby said brush is held in a normally raised position, and means permitting the depression of said brush.

4. In an apparatus of the class described, the combination with a water supply tube and a cylindrical casing, of a receptacle pivotally mounted therein, said receptacle having an open side receptive of the article to be cleansed, means for oscillating said receptacle, a brush normally contained in said casing enterable within said receptacle, a tube supporting said brush connected with said supply tube, means for raising or lowering said tube, and means for imparting rotary motion to said tube.

In testimony whereof we have affixed our signatures this 20th day of November, 1916.

ANTONI CZAJA.
JOHN HAREZA.

Copies of this patent may be obtained for five cents each, by addressing the "Commissioner of Patents, Washington, D. C."